G. T. OWENS.
HORSE DETACHER.
No. 176,803. Patented May 2, 1876.
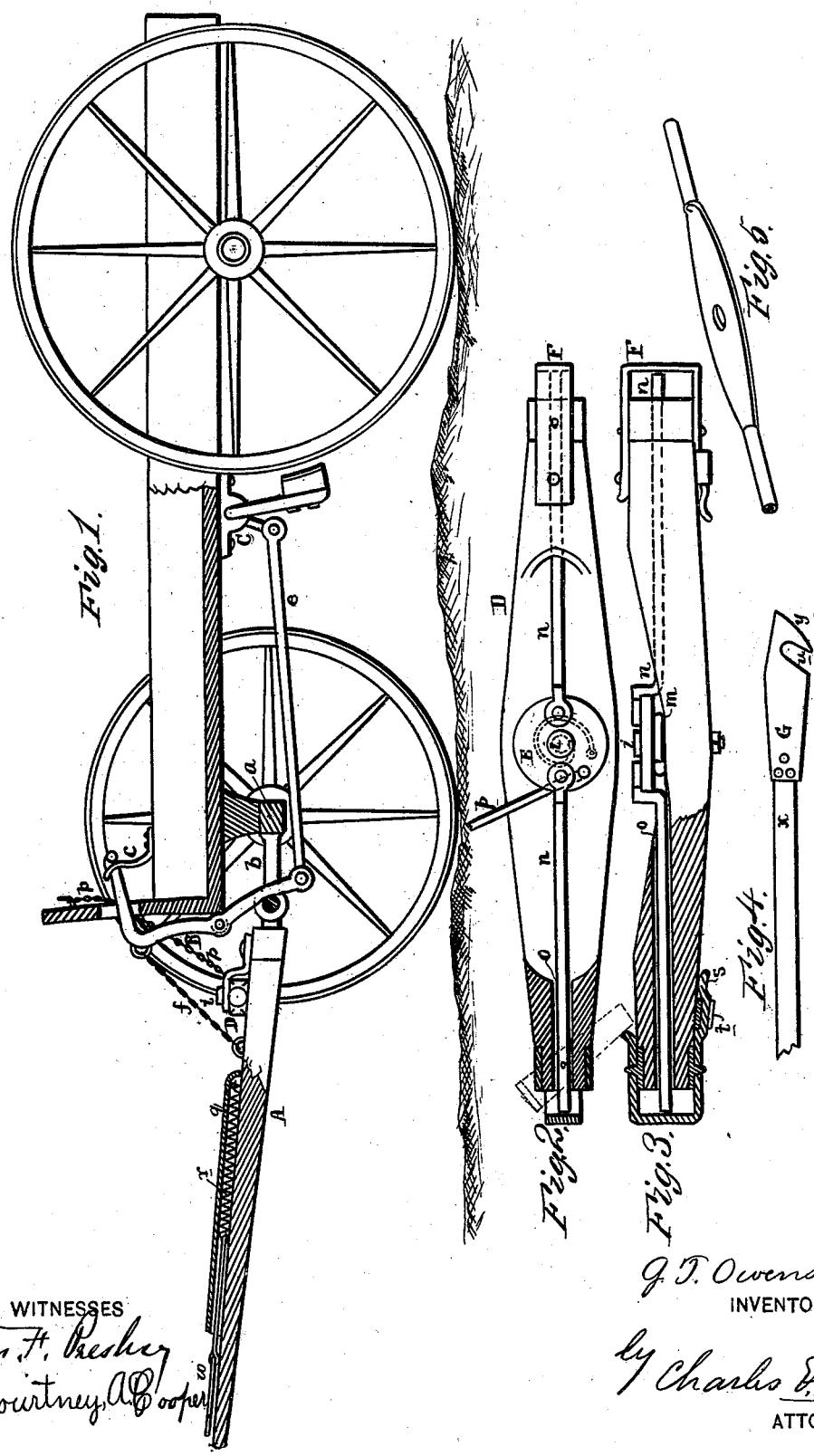
INVENTOR
J. T. Owens
ATTORNEY
Charles E. Foster

UNITED STATES PATENT OFFICE.

GRANVILLE T. OWENS, OF OWENSVILLE, VIRGINIA.

IMPROVEMENT IN HORSE-DETACHERS.

Specification forming part of Letters Patent No. 176,803, dated May 2, 1876; application filed December 6, 1875.

*To all whom it may concern:*

Be it known that I, GRANVILLE T. OWENS, of Owensville, Albemarle county, Virginia, have invented certain Improvements in Vehicles, of which the following is a specification:

The object of my invention is to readily detach animals from whiffletrees to which the traces are connected, and to prevent the movement of the vehicle after the animal is detached; and these objects I attain by the devices illustrated in the accompanying drawing, in which—

Figure 1 is an elevation, partly in section, of a vehicle with my improvements; Figs. 2 and 3, enlarged views, partly in section, showing the whiffletree; Fig. 4, a detached view; and Fig. 5, a perspective view, showing a modification.

The body of the vehicle is of any suitable form, the rear wheels turning on a stationary axle, and the front axle being pivoted to the body in the ordinary manner. To brackets $b$, projecting from the front axle, is jointed the tongue or the shafts A, a tongue being shown in the present instance. To the body of the vehicle, at the front, is jointed a lever, B, one end of which extends through a slot in the dash-board, or through the bottom of the vehicle, to a position where it may be reached by the foot of the driver, and against projections on this end of the lever bears a spring, $c$.

Rods $e$ connect the lower end of the lever B to the brake-shaft C, so that when the upper end of the lever is forced outward by the foot of the driver, the brake-shoes will be pressed against the rim of the wheel, the spring restoring the parts to their first position when the pressure is removed. A chain or rod, $f$, is connected to the tongue A and to the lever B, for a purpose described hereafter. The whiffletrees D are pivoted to the tongue in the usual way, each by a pin, $i$, and upon the latter, above the whiffletree, which is reduced in thickness at this point, turns a plate or lever, E, a spring, $m$, below the plate tending to maintain the latter in the position shown in Fig. 3. Rods $n$ $n$ are jointed, at their inner ends, to the lever E, and extend through longitudinal openings $o$ in the ends of the whiffletree, projecting beyond the latter. To lugs projecting from the ferrules of the whiffletree are pivoted yokes F, each of which has an elastic arm, $s$, adapted to a notch in a plate, $t$, at the under side of the whiffletree.

A chain or rod, $p$, connected to one side of the disk E, extends within the vehicle to a position to be seized readily by the driver. Each trace has at its inner end a plate, G, having a notch, $u$, and an inclined end, $y$, the latter, when the plate is forced against the rod $n$, bearing upon the same and raising the yoke, which is slightly elastic, until the rod $n$ enters the slot $u$.

When the ordinary traces are used the yoke is turned to the position shown in dotted lines, Fig. 2, the trace is placed upon the projecting rod $n$, and is secured by turning the yoke to its first position, in which it is retained by the elastic arm $s$ slipping into the notch $t$. Should an animal become unmanageable the driver, drawing upon the rod or chain $p$, turns the disk E, which, as it revolves, retracts the rods $n$ $n$, thereby releasing the traces and detaching the animal from the whiffletree. As the tongue falls, its weight, drawing upon the chain $f$, turns the lever B, applies the brakes, and arrests the further movement of the vehicle, the tongue being kept free from the ground.

On some occasions the detaching of the traces is sufficient to quiet the animal, which may be prevented from escaping by a spring, $r$, inclosed in a case, $q$, on the pole A, and connected to a rod, $w$, to which the bridle is attached, the spring yielding to the movements of the animal to a limited extent. When metal whiffletrees are employed they may be constructed as shown in Fig. 5, flattened in the center, and with tubular ends.

Without confining myself to the precise details, I claim—

1. The combination, in a whiffletree, of t sliding rods $n$ and adjustable yokes F, substantially as set forth.

2. The combination of the pole or shafts A, the brake shaft or lever, and rod or chain connecting the same, so that the brakes are applied on the descent of the pole, and the downward motion of the latter limited, as set forth.

3. The spring $r$, provided with a hitching-rod, $w$, and combined with the pole A, substantially as and for the purpose specified.

In testimony whereof I have signed my name to this specification in the presence of two subscribing witnesses.

G. T. OWENS.

Witnesses:
CHARLES E. FOSTER,
E. L. HOUFF.